United States Patent
Maurer et al.

(10) Patent No.: US 6,769,801 B1
(45) Date of Patent: Aug. 3, 2004

(54) STATIC MIXER WITH PRECISION CAST ELEMENTS

(75) Inventors: Rudolf Maurer, Winterthur (CH); Joachim Studlek, Asslar (DE)

(73) Assignee: Sulzer Chemtech AG, Winterthur (CH)

(*) Notice: Subject to any disclaimer, the term of this patent is extended or adjusted under 35 U.S.C. 154(b) by 57 days.

(21) Appl. No.: 09/691,645

(22) Filed: Oct. 18, 2000

(30) Foreign Application Priority Data

Nov. 10, 1999 (EP) ............................................ 99811032

(51) Int. Cl.⁷ ................................................. B01F 5/06
(52) U.S. Cl. ..................................................... 366/337
(58) Field of Search ................................ 366/336–340, 366/158.5; 137/42; 222/145.6; 264/328.18; 425/197, 199, 200, 205; 48/189.4; 55/445, 446

(56) References Cited

U.S. PATENT DOCUMENTS

| | | | | |
|---|---|---|---|---|
| 1,857,348 A | * | 5/1932 | Bokenkroger |
| 3,923,288 A | * | 12/1975 | King |
| 4,183,682 A | * | 1/1980 | Lieffers |
| 4,208,136 A | * | 6/1980 | King |
| 4,600,544 A | * | 7/1986 | Mix |
| 4,614,440 A | * | 9/1986 | King |
| 4,892,379 A | * | 1/1990 | Takeda et al. |
| 4,907,725 A | * | 3/1990 | Durham |
| 5,368,382 A | * | 11/1994 | Kawasaki et al. |
| 5,564,827 A | * | 10/1996 | Singer |
| 5,605,399 A | * | 2/1997 | King |
| 6,109,781 A | * | 8/2000 | Ogasawara et al. |
| 6,217,208 B1 | * | 4/2001 | Schuchardt |
| 6,394,644 B1 | * | 5/2002 | Streiff |
| 2001/0053108 A1 | * | 12/2001 | Jahn et al. |

FOREIGN PATENT DOCUMENTS

EP 0646408 A1 4/1995

* cited by examiner

*Primary Examiner*—Charles E. Cooley
*Assistant Examiner*—David Sorkin
(74) *Attorney, Agent, or Firm*—William Michael Hynes; Townsend and Townsend and Crew LLP

(57) ABSTRACT

The static mixer contains precision cast elements (1) which are arranged along a central axis (10) and which in each case have a reinforcement region (4) at their circumference which extends over the entire circumference. These cast elements (1) are assembled with intermediate elements (2) to form a cylindrical body. Joint locations between the elements (1, 2) form surfaces (40*a*, 40*b*, 20*a*, 20*b*) which stand transversely to the central axis. For each isolated cast element, in a rotation about its central axis the joint locations are accessible to machining tools for a subsequent machining—in particular for a grinding or turning. As a result of the subsequent machining a predetermined total length (L) of the mixer in the direction of the central axis can be precisely achieved.

9 Claims, 3 Drawing Sheets

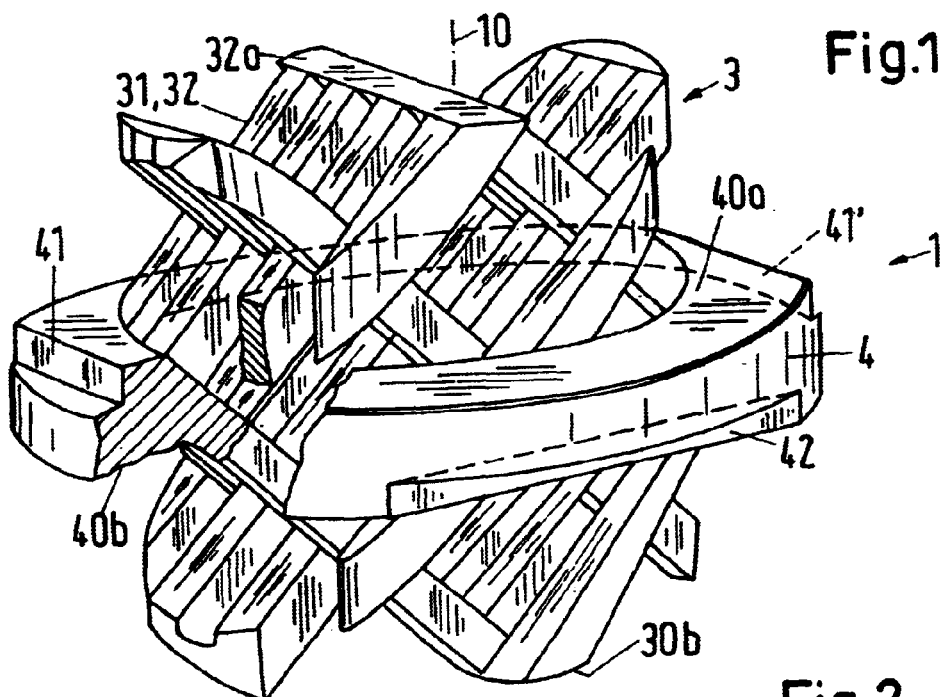
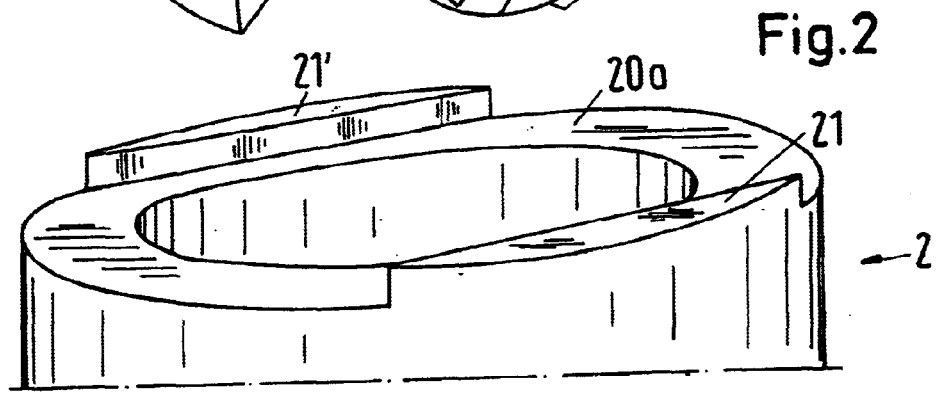
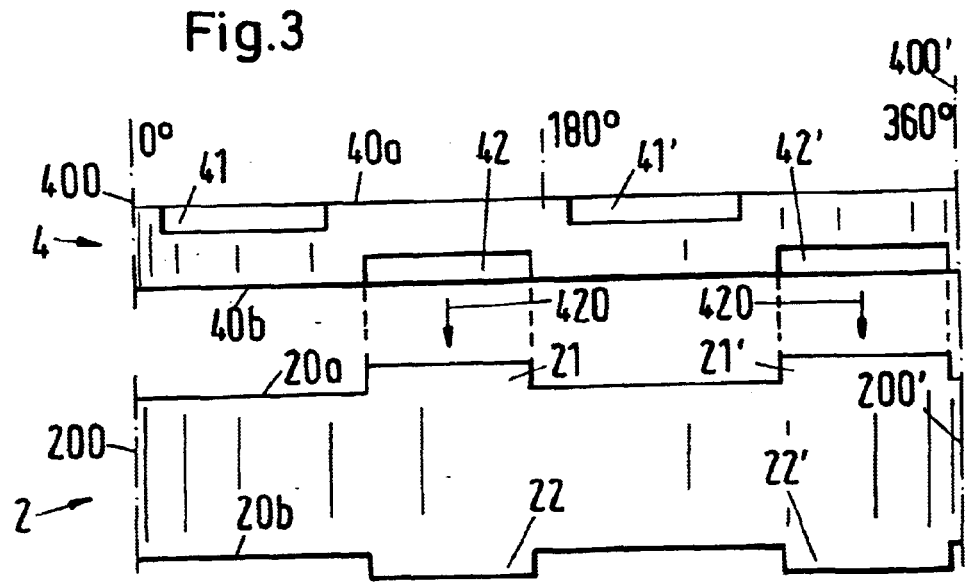

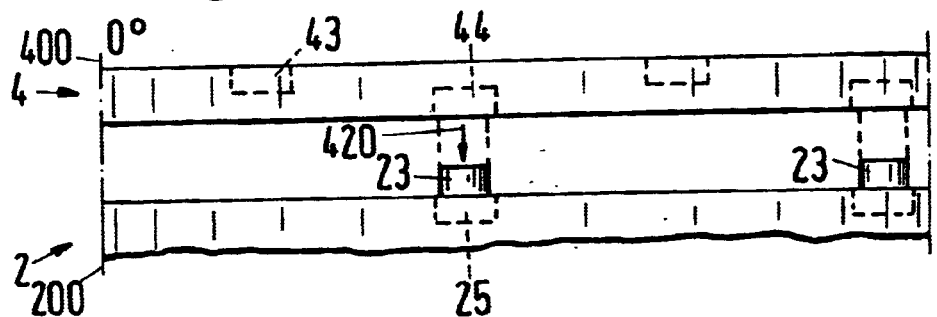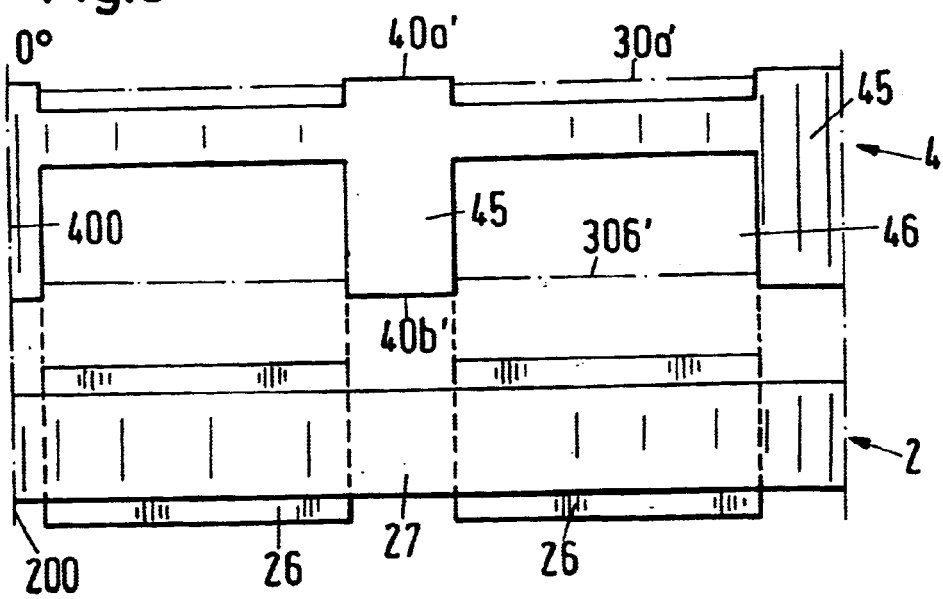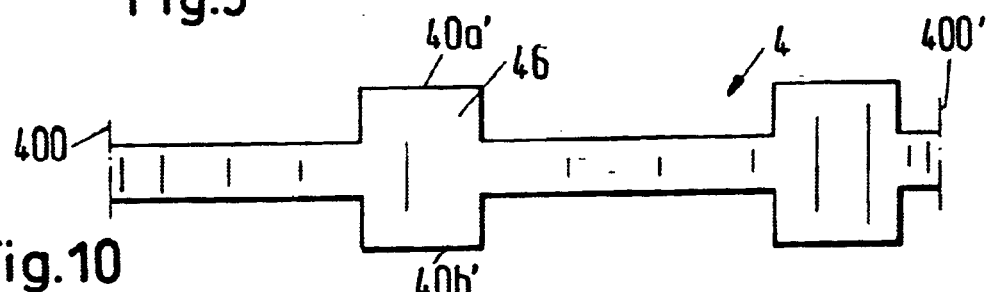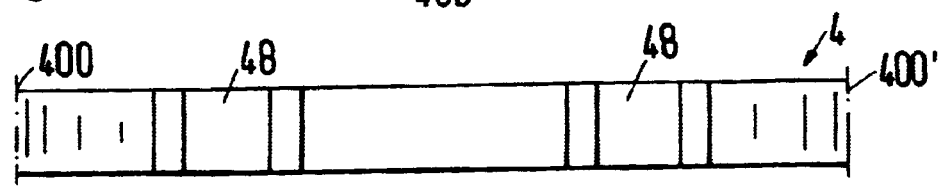

US 6,769,801 B1

STATIC MIXER WITH PRECISION CAST ELEMENTS

BACKGROUND OF THE INVENTION

The invention relates to a static mixer with precision cast elements arranged along a central axis, to a cast element for a mixer of this kind, and to a method for manufacturing the mixer as well as to uses.

A static mixer by means of which highly viscous polymer melts can be homogenized is known from Signer U.S. Pat. No. 5,564,827. This mixer can be used as a mixer head in the nozzle of an injection molding machine or as a melt mixer following the helix of an extruder. It is assembled from cast elements and intermediate elements and has a cylindrical shape. The cast elements contain structures, for example grid structures, which effect a mixing process in a through-flowing melt. The structures which are shown in Signer U.S. Pat. No. 5,564,827 are built up of layers which contain passages and which are oriented parallel to a central axis. In a preferred embodiment the intermediate elements together with parts of the cast elements, namely with flange-like reinforcing rings, form a tubular jacket, within which a plurality of mixer structures are arranged one behind the other. In adjacent mixer structures the layers are in each case displaced with respect to one another by a predetermined angle, preferably by 90°. In order that this displacement is reliably produced in the assembly of the static mixer, cams are molded on the reinforcing rings and cut-outs are provided at the intermediate elements in a manner which is complementary to the cams. In a correct assembly the cams fit into the corresponding cut-outs and thus provide for a predetermined orientation of the elements.

The cast elements can be manufactured by means of precision casting to within tolerances of 0.1 mm. For use in injection molding machines this tolerance is insufficient. Because of the sealing, a total length of the static mixer which is to be strictly observed is required in machines of this kind.

SUMMARY OF THE INVENTION

The object of the invention is to further develop the static mixer of the named embodiment in such a manner that, a predetermined total length of the mixer, such as for example is required in injection molding machines, can be manufactured precisely.

The static mixer contains precision cast elements which are arranged along a central axis and which in each case have a reinforcement region at their circumference which extends over the entire circumference. These cast elements are assembled with intermediate elements to form a cylindrical body. Joint locations between the elements form surfaces which stand transversely to the central axis. For each isolated cast element, in a rotation about its central axis, the joint locations are accessible to machining tools for subsequent machining—in particular for grinding or turning. As a result of the subsequent machining a predetermined total length of the mixer in the direction of the central axis can be precisely achieved.

In the known cast elements a required subsequent machining is made impossible due to the cams at the reinforcing rings. In the intermediate elements a subsequent machining is not required since the latter can be brought into a predetermined shape from a tube by a cutting method, with it being possible to produce the required precision.

The invention will be explained in the following with reference to the drawings.

BRIEF DESCRIPTION OF THE DRAWINGS

FIG. 1 is a first embodiment of the cast element in accordance with the invention having a reinforcing ring, FIG. 2 is an end of an intermediate element fitting with the cast element of FIG. 1, FIG. 3 is a developed projection of the circumference of said reinforcing ring and a corresponding developed projection of the intermediate element, FIGS. 7, 8 are developed projections as in FIG. 3 of a second and of a third embodiment, respectively, and FIGS. 9, 10 are developed projections of the reinforcing rings of two further embodiments.

DESCRIPTION OF THE PREFERRED EMBODIMENTS

Figure 4:
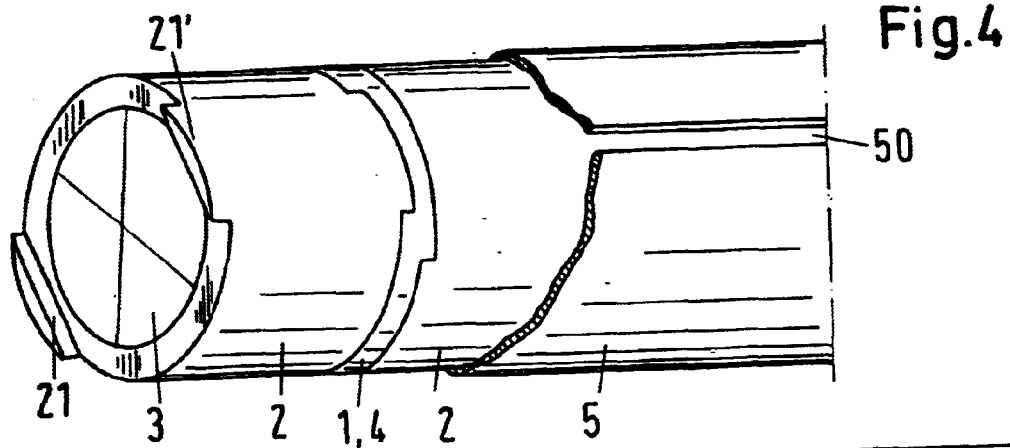
FIG. 4 is an oblique view which illustrates a part of a mixer in accordance with the invention.

A cast element 1 in accordance with FIG. 1 can be manufactured through a precision casting in which a casting mold is formed by means of a wax body, the application of a ceramic jacket onto the wax body, subsequent removal of the wax and a firing of the ceramic jacket. By this casting method, a tolerance of about 0.1 mm results for the attainable accuracy of fit. Usually, the cast element 1 is cast from a metallic alloy. With other casting methods casting elements 1 can also be manufactured of ceramic material or plastic. A gridwork 3—namely the mixer structure 3—and a reinforcing ring 4 form the cast element 1 in the form of a monolithic body. The gridwork 3 is assembled from webs 31 which are arranged in layers 32. The layers 32 are oriented parallel to a central axis 10. The webs 31 of adjacent layers 32 cross one another and enclose a uniform angle of 45° with respect to the direction of the central axis 10. This angle can also have a value between 10 and 70°. The flange-like ring 4 is a reinforcement region which extends over the entire circumference of the cast element 1.

The static mixer is assembled from a plurality of cast elements 1 and intermediate elements 2, see FIG. 2, which are arranged along the central axis 10 and which thus form a cylindrical body. The mixer structures 3 are formed in such a manner that in the assembled mixer the ends 30a and 30b of adjacent cast elements 1 do not make contact. The elements 1 and 2 are in contact at joint locations which are formed by ring-shaped surfaces 40a, 40b of the reinforcing ring 4 and ring-shaped surfaces 20a, 20b (see FIG. 3) of the intermediate elements 2. These surfaces 40a, 40b and 20a, 20b form the only joint locations. In FIG. 3 a developed projection of the circumference of the reinforcing ring 4 and a corresponding developed projection of the intermediate element 2 are illustrated. Arrows 420 indicate how the ring 4 can be placed onto the intermediate element 2. The lateral lines 400 and 400' and, respectively, 200 and 200' are intersection lines, at which in each case the circumference is enclosed (angles 0° and 360°).

The reinforcing ring 4 has at the surface 40a segment-like cut-outs 41, 41' and at the surface 40b similarly shaped cut-outs 42, 42' which are complementary to projections 21, 21' and 22, 22' respectively of the intermediate element 2. The cut-outs 41, 41', 42, 42' form two pairs, wherein the cut-outs of the pairs 41, 41' and, respectively, 42, 42' in each case are arranged diametrically opposite to one another and wherein the two pairs are offset with respect to one another by 90°. The corresponding projections 21, 21', 22, 22' of the intermediate element 2 are arranged in such a manner that in each case two of the projections 21 and 22 and, respectively, 21' and 22' are aligned one after the other in the direction of the central axis 10. Through these arrangements an offset of the grid structures 3 between two adjacent cast elements 1 by 90° results.

The oblique view of FIG. 4 shows a part of a mixer in accordance with the invention. The mixer structure 3 is indicated by two mutually crossing diameters. The cast elements 1 and intermediate elements 2 can be held together by a longitudinally slit cylinder 5 (slit 50) of a resiliently elastic sheet metal lamina.

Figure 5:
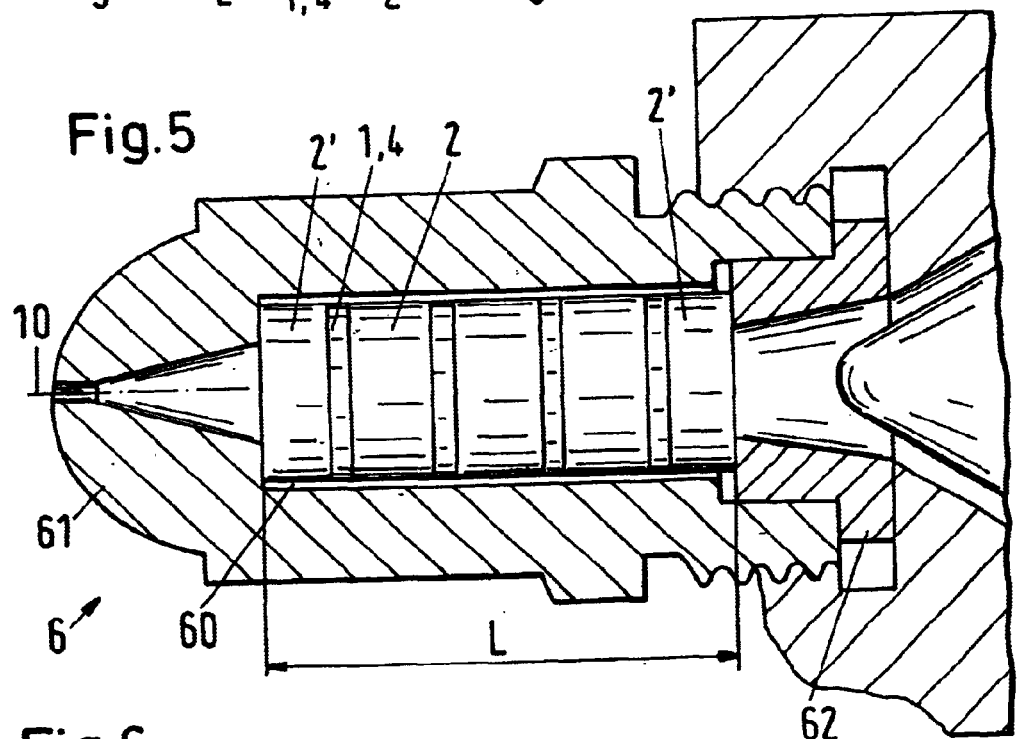
FIG. 5 is a longitudinal section through a nozzle which contains a mixer head.

The joint locations between the elements 1 and 2 are transverse to the central axis 10. The joint locations which are given by surfaces 40a, 40b of the cast element 1 are accessible to machining tools for a subsequent machining when the isolated cast element is rotated about its central axis 10. It can be subsequently machined by grinding or turning. As a result of the subsequent machining a predetermined total length L of the mixer in the direction of the central axis 10 can be precisely achieved, so that the mixer for example fits exactly into a nozzle 6, as illustrated in FIG. 5. The mixer is inserted sealingly in a cavity 60 of a nozzle capsule 61 while being pressed by a component 62.

Figure 6:
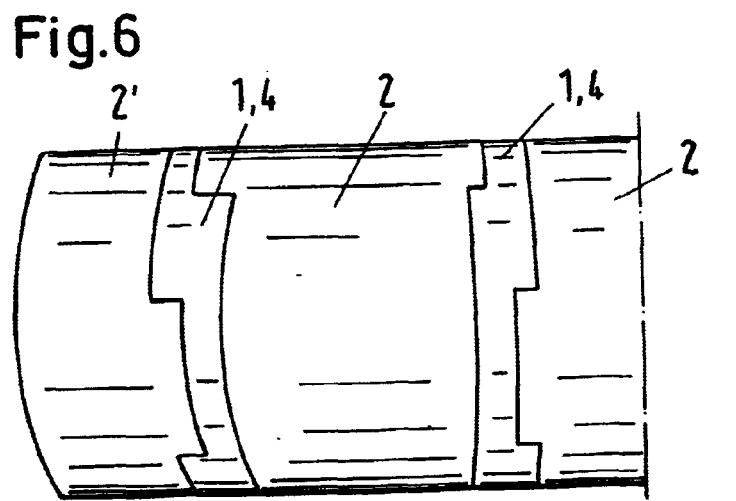
FIG. 6 is a perspective illustration of the end region of the first embodiment of the mixer in accordance with the invention.

At its ends the mixer has suitably modified end pieces 2' instead of intermediate elements 2. FIG. 6 illustrates in a perspective illustration the mixer end region with the end piece 2'.

Further possibilities for realizing the mixer in accordance with the invention are conceivable in addition to the above described first embodiment. Some of the above parts of the intermediate elements 2 can be separate parts which are fitted into cut-outs of the intermediate element 2. One example is shown in FIG. 7. Cut-outs 43 and 44 in the reinforcing ring 4 are formed as circular blind holes. Corresponding projections 23 of the intermediate element 2 are cylindrical bolts 23, which are fitted into cut-outs. Furthermore, only one bolt 23 with corresponding cut-outs 25 and 44 or 43 can be provided in each case per joint location.

In the exemplary embodiment shown in FIG. 8 the reinforcement region 4 is a ring which is extended by two webs 45 which cross the ring 4. The reinforcement region 4 has all over the same thickness, which all over same thickness is also provided for two wall pieces 26 of the intermediate element 2. These wall pieces 26 fill the gaps between the webs 45, with a certain clearance being provided. At the same time they form a toothing between adjacent cast elements 1. The wall pieces 26 are connected to one another via a sheet metal laminate ring 27 and thus form the intermediate element 2. The positions of the two ends 30a and 30b of the mixer structure 3 are indicated by the chain-dotted lines 30a' and 30b'. In the assembled mixer the surfaces 40a' and 40b' form a joint location between adjacent cast elements 1. There are no length-determining joint locations between the cast elements 1 and the intermediate elements 2. In this exemplary embodiment the angular displacement of adjacent mixer structures 3 is not produced by the reinforcement 4. Therefore, two different cast elements 1 must be provided which differ by a different orientation of the mixer structures 3 relative to the arrangement of the webs 45.

In the exemplary embodiment in accordance with FIG. 9 the intermediate element 2 (not illustrated) is formed similarly as in the first exemplary embodiment. Joint locations are again formed by surfaces 40a' and 40b' of the reinforcement region 4 and corresponding surfaces of the intermediate element 2.

In the exemplary embodiment of FIG. 10 the reinforcement region 4 is again formed in the shape of a ring, and cut-outs are formed by trapezoidal grooves 48.

What is claimed is:

1. A static mixer comprising:

precision cast static mixer elements (1) arranged along a central axis (10), each precision cast static mixer element having a circumferential reinforcement region (4);

intermediate elements (2) abutting the circumferential reinforcement region (4) and forming in combination with the precision cast static mixer elements a static mixer body of a preselected length with a periphery defined by the reinforcement region and the intermediate elements; and joints between the reinforcement region (4) and the intermediate elements (2) defining first and second continuous joint surfaces (40a, 40b and 20a, 20b) and mutually defining a seal formed between the first and second continuous joint surfaces between the reinforcement regions (4) and the intermediate elements (2);

a first continuous entirely planar, circumferential joint surface defining at least one cut-out having an upwardly extending cavity;

a second continuous entirely planar, circumferential joint surface adjacent a protrusion for extending into the at least one cut-out of the first continuous entirely planar, circumferential joint surface for positioning the reinforcement region and the intermediate elements at the seal of the first and second continuous entirely planar, circumferential joint surfaces with respect to each other;

the first continuous entirely planar, circumferential joint surface defining the at least one cut-out having an upwardly extending cavity of sufficient dimension for receiving the protrusion adjacent the second continuous entirely planar, circumferential surface without obstruction within the cavity while permitting the first and second continuous entirely planar, circumferential joint surfaces to define the seal, whereby the first continuous entirely planar, circumferential joint surface defines an unobstructed planar surface to enable machining access for adjusting the length of the static mixer.

2. The static mixer of claim 1 wherein:

the reinforcement regions (4) of the precision cast static mixer elements (1) are ring-shaped;

the reinforcement regions (4) have the first entirely planar, circumferential continuous joint surface defining cut-outs (41, 41', 42, 42') configured in the reinforcement regions (4); and the second continuous entirely planar, circumferential joint surface and the protrusion (21, 21', 22, 22', 23) being located on the at least one intermediate element (2), the projecting part having a shape complementary to a shape of the cut-outs.

3. The static mixer of claim 2 wherein:

at least some of the protrusions are separate parts (23) fitted into cut-outs (25) in the intermediate elements (2).

4. The static mixer of claim 2 wherein:

first cut-outs (41, 41') are configured on one side of the reinforcement regions (4); and second cut-outs (42, 42') are configured on the other side of the reinforcement regions (4) and displaced 90° from the first cut-outs (41, 41').

5. The static mixer of claim 1 further including:

a longitudinally slit cylinder (5) of resiliently elastic sheet metal laminate holding the precision cast static mixer elements (1) at the reinforcement region (4) and the intermediate element (2) together.

6. The static mixer of claim 1 and wherein:

the precision cast static mixer elements (1) each comprise a gridwork (3) of webs (31) which are arranged in layers oriented parallel to the central axis (10) with the webs of adjacent layers crossing one another.

7. The static mixer of claim 6 and wherein:

the webs of adjacent layers cross one another and enclose angles between 10° and 70°.

8. The static mixer of claim 6 and wherein:

the gridwork (3) of webs (31) is co-cast with the reinforcement regions (4).

9. The static mixer of claim 1 and wherein:

the precision cast static mixer elements (1) are manufactured from the group consisting of a metallic alloy, a ceramic material, and a plastic.

* * * * *